RE 25465
May 29, 1962     G. A. McCORMICK ETAL     3,036,723
VEHICLE WHEEL DOLLY
Filed Aug. 28, 1959     2 Sheets-Sheet 1
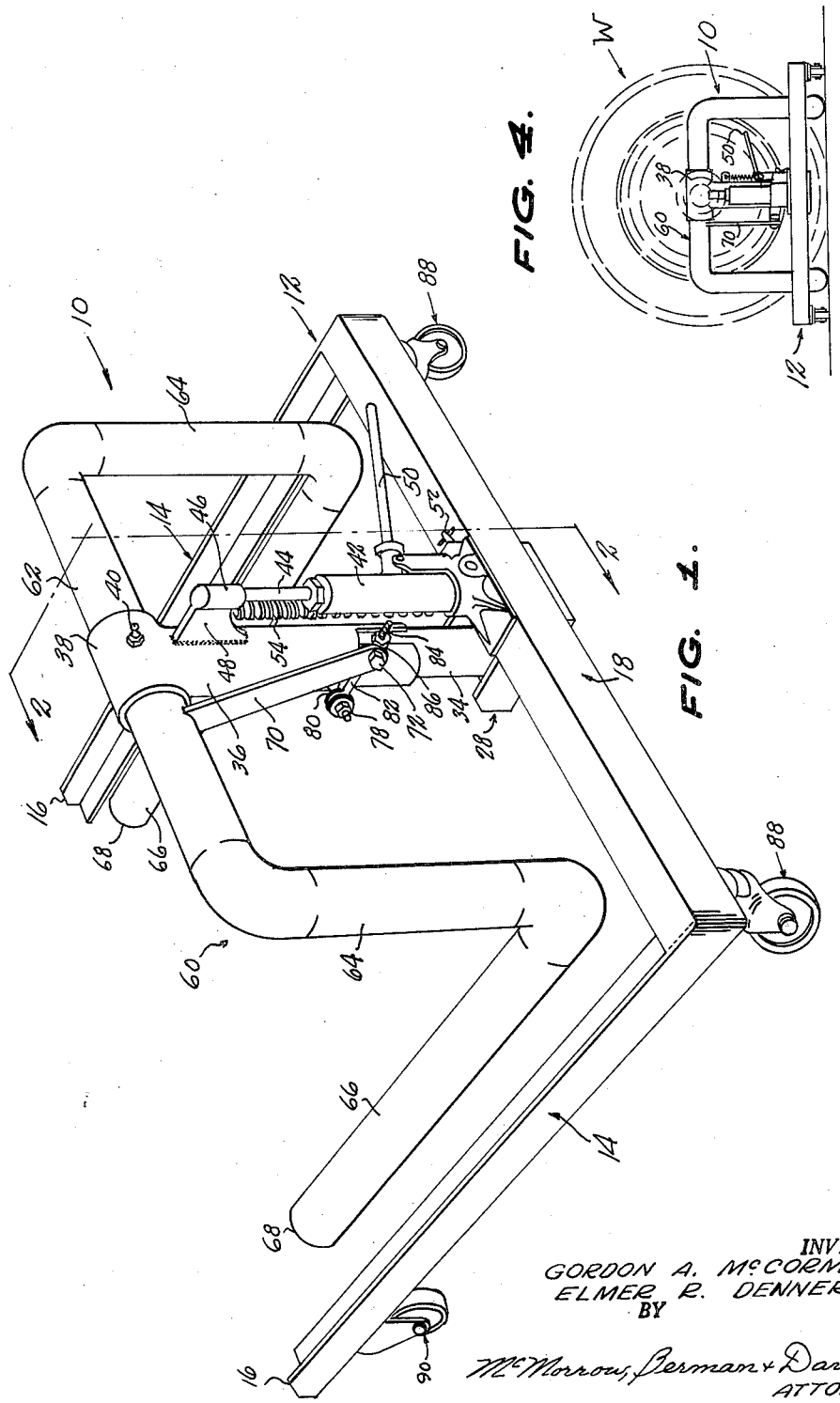
INVENTORS
GORDON A. McCORMICK,
ELMER R. DENNERLINE,
BY
McMorrow, Berman & Davidson
ATTORNEYS.

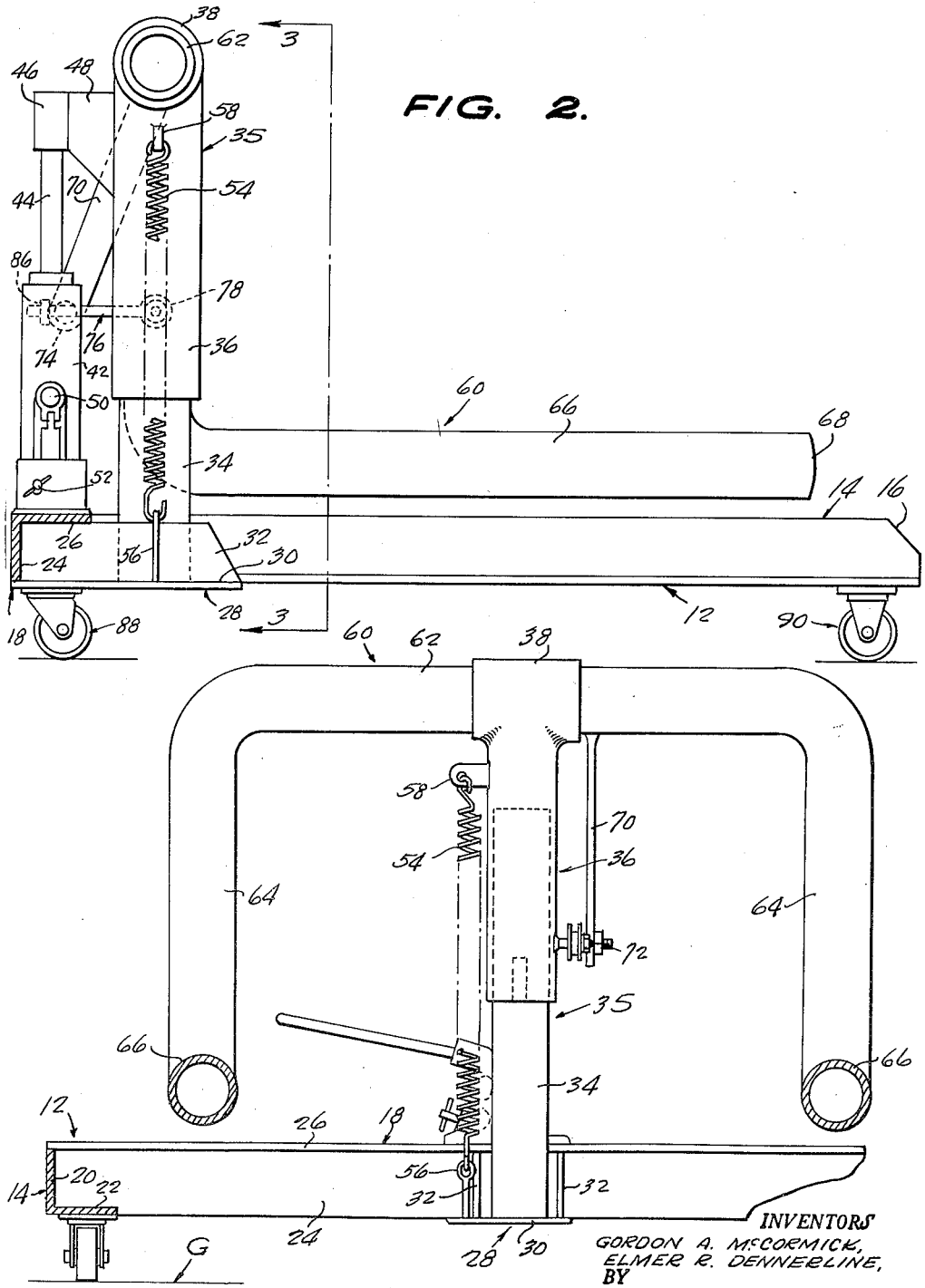

United States Patent Office 3,036,723
Patented May 29, 1962

3,036,723
VEHICLE WHEEL DOLLY
Gordon A. McCormick, 1711 Arthur St., and Elmer R. Dennerline, 1717 Arthur St., both of Caldwell, Idaho
Filed Aug. 28, 1959, Ser. No. 836,736
5 Claims. (Cl. 214—331)

This invention relates to a novel dolly for the removal and replacement of vehicle wheels, especially but not exclusively, dual truck wheels.

The primary object of the invention is to provide a more versatile, more efficient, and labor saving dolly of the kind indicated which substantially facilitates wheel removal and remounting on axle structures, and picking up, carrying, and lifting of a wheel, the dolly having a fork lift which is slidable crosswise of a wheeled base frame to permit the wheel to be moved horizontally relative to the base frame for removing the wheel from and putting the wheel on an axle structure, and for removing the axle and bearing of the structure with the dolly in place, the fork lift being tiltable relative to the base frame for lining up a removed wheel and its drum with its axle structure and its brake, for reinstalling the wheel.

Another object of the invention is to provide a dolly of the character indicated above which is of simplified and uncomplicated constructions and is composed of a small number of simple and easily replaceable and easily serviceable parts, and which can be made in rugged and durable forms at relatively low cost.

Other important objects and advantageous features of the invention will be apparent from the following description and the accompanying drawings, wherein, for purposes of illustration only, a specific form of the invention is set forth in detail.

In the drawings:

FIGURE 1 is a perspective view of a dolly of the present invention;

FIGURE 2 is a vertical longitudinal section taken on the line 2—2 of FIGURE 1;

FIGURE 3 is a fragmentary vertical transverse section taken on the line 3—3 of FIGURE 2; and FIGURE 4 is an end elevation of the dolly, on a reduced scale, showing the same applied to a dual wheel.

Referring in detail to the drawings, wherein like numerals designate like parts throughout the several views, the illustrated dolly, generally designated 10, comprises a U-shaped horizontal base frame 12, which comprises parallel spaced legs 14 having free leading ends 16, and a bight portion 18 extending between and fixed to the other or trailing ends of the legs 14. As seen in FIGURES 1 to 3, the legs 14 are angle forms having vertical flanges 20 having inwardly directed horizontal flanges 22 on their lower edges; and the bight portion 18 is an angle form having a vertical flange 24 on whose upper edge is an inwardly extending horizontal flange 26.

A post bracket 28 of channel form is fixed centrally to and extends from the inward side of the bight portion 18 and has a bottom web 30 secured, as seen in FIGURE 2, to the lower edge of the vertical flange 24 and upstanding side walls 32 which are secured to the vertical flange 24 and to the horizontal flange 26.

Suitably fixed at its lower end to and upon the bracket web 30 between the side walls 32 is an upstanding perpendicular stationary post 34 of an extensible upright 35 which rises to a substantial height above the base frame 12, as seen in FIGURE 3. Slidably telescoped over the post 34 is an upstanding tubular upright slide 36 which has fixed on its upper end a cross head in the form of a horizontal bearing sleeve 38, which is provided with a lubricating fitting 40.

Fixed upon the upper side of the horizontal flange 26 of the base frame bight portion 18, in line with the post 34 is a hydraulic jack body 42 having a piston rod 44 extending from its upper end and fixed, as indicated at 46, to the free end of a bracket arm 48 which is fixed to the upper part of the tubular slide 36. Mounted on the jack body 42 is a swingable actuating handle 50 for extending the piston rod 44 to elevate the slide 36. A manual pressure releasing valve control 52 extends from the jack body 42 which is operable to permit the jack to contract and the slide 36 to subside from an elevated position. To assist and accelerate the rate of subsidence of the slide 36, upon operation of the control 52, a vertical helical contractile spring 54 is provided, which is anchored at its lower end, as indicated at 56, to the post bracket 28, and is secured, at its upper end, to a lug 58 on the side of the slide 36, in a stretched condition.

The illustrated dolly 10 further comprises a fork lift, generally designated 60, preferably made of heavy tubing, which comprises a horizontal cross member 62 which is slidably and rotatably engaged through the horizontal bearing sleeve 38. The cross member 62 is shorter than the space between the base frame legs 14, in order that the fork lift 60 can subside below the level of and within the legs of the base frame 12, so as to assume a position close to the ground G, so as to facilitate removal of and loading of a dual wheel W on the fork lift.

The fork lift 60 is U-shaped in plan and L-shaped in side elevation, by reason of having depending arms 64 fixed on the ends of the cross member 62, which have fixed on their lower ends horizontal, parallel spaced lift arms 66, which have free leading ends 68, which are located in the region of and are preferably longitudinally spaced from the free ends 16 of the base frame legs 14. The lift arms 64 are parallel to and are spaced from the inward sides of the base frame legs 14, at distances sufficient to permit of crosswise adjustment of the lift fork in depressed positions thereof.

For adjustably holding the lift fork 60 in horizontal, or in angled positions, relative to the base frame 12 and the ground G, lockable adjusting means is provided, which preferably comprises a lever 70 which is fixed to and depends from the cross member 62, at the side of the slide 36 remote from the spring 54, and is traversed at its lower end by a stud 72 which secures a sleeve block 74 to the inward side of the lever 70. A link 76 is pivotally secured at one end, as indicated at 78 on a boss 80 on the adjacent side of the lower part of the slide 36, and has a smooth shank 82 sliding through the sleeve block 74. The smooth shank 82 has a threaded free end portion 84 on which is threaded an adjusting and holding nut 86 which bears against the adjacent end of the block 74. Running the nut 86 toward the slide 36 swings the lever 70 in the same direction, and tilts the fork lift 60 upwardly away from the base frame 12 and the ground G, whereas backing off the nut 86 on the link shank lets the fork lift subside to a level horizontal position, from an uptilted position, or from a horizontal position to a downtilted or declining position. With a wheel W resting upon the lift arms 66 letting the arms 66 down to the floor or ground G, by releasing the jack, enables the dolly to be backed away so as to leave the wheel on the ground.

The dolly 10 is applied to a wheel W with the base frame legs 14 at opposite sides thereof, and with the fork lift arms 66 at ground level at opposite sides of and at the bottom of the wheel W and the jack operated to elevate the wheel on the arms 66. For maneuvering and positioning the base frame 12 there are provided, at the meetings of base frame bight portion 18 and the legs 14, swivel caster wheels 88, and at the free trailing ends 16 of the legs 14, fixed ground-engaging wheels 90. This arrangement of wheels provides an accurate and controlled guiding of the dolly 10 over the ground G, while eliminating the vagrant action which swivel wheels on the free ends of the base frame legs 14 would involve.

Once the base frame 12 has been approximately lined up with a wheel W, the jack handle 50 is operated to elevate the lift fork 60 from a depressed position, and apply its arms 66 to the opposite sides of the underpart of the wheel, whereat the wheel is disconnected from its axle structure and borne away by pulling and pushing the dolly 10 over the ground G.

The nut 86 is adjusted along the shank 82 only when it is desired to adjust the angle of the lift fork arms 66, so as to line up a wheel with its axle structure, as when reapplying a removed wheel to the axle structure, so as to render such reapplication easy and accurate.

The dolly 10 permits of removing the axle and the bearing assembly of an axle structure while the dolly 10 is in place therebeneath, and without changing the ground position of the base frame 12.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A wheel dolly comprising a horizontal wheeled base frame, post means fixed to and upstanding on said frame, a fork lift having an inverted U-shaped portion comprising a cross-member, a vertical slide sleeve means journalled at its upper end on and extending downwardly from said cross member and telescopically engaged with said post means, vertical jack means mounted on said frame and operatively connected with said slide sleeve, a lever fixed to and extending downwardly from said cross member, and tilt adjustment means connected to and extending between said lever and said slide sleeve.

2. A wheel dolly comprising a horizontal wheeled base frame, a post fixed to and upstanding on said frame, a fork lift having an inverted U-shaped portion comprising a cross-member, a vertical slide sleeve journalled at its upper end on and extending downwardly from said cross member and telescopically engaged with said post, vertical jack means mounted on said frame and operatively connected with said slide sleeve, a lever fixed to and extending downwardly from said cross member, and tilt adjustment means connected to and extending between said lever and said slide sleeve, said adjustment means comprising a link pivoted to said slide sleeve, said link having a shank having a smooth portion and a threaded portion, and adjusting nut threaded on said threaded portion, a block pivoted on said lever and having a smooth bore through which said smooth shank portion extends, said nut being engaged with the side of said block remote from the slide sleeve.

3. A wheel dolly comprising a U-shaped horizontal wheeled frame having a bight portion and parallel spaced legs, a post fixed to and upstanding from said bight portion, a lift fork comprising a cross member having depending arms having thereon horizontal lift arms extending along related legs of the wheeled frame, a vertical slide sleeve connected at its upper end to said cross member, said slide sleeve being slidably and telescopically engaged with said post, a bracket fixed to and extending forwardly from said bight portion on which said post is mounted forwardly of the bight portion, a bracket arm fixed on and extending rearwardly from said slide sleeve, and a vertical jack engaged with and extending between said bight portion and said bracket arm, said cross member being horizontally journalled on said slide sleeve, a depending lever fixed to said cross member and angled downwardly and rearwardly therefrom, and longitudinally adjustable tilting means pivoted at opposite ends to and extending between said lever and said slide sleeve.

4. A wheel dolly comprising a horizontal U-shaped wheeled frame having a cross member and spaced legs extending forwardly from the cross member, a post fixed to and rising from said cross member and positioned in front of said cross member, a vertical slide sleeve engaged on said post, said slide sleeve having a journal on its upper end extending crosswise of said frame, a fork lift having an inverted U-shaped portion comprising a cross member journalled through said journal and pendant legs, horizontal arms fixed to and extending forwardly from the lower ends of said pendant legs, said arms extending along the inward sides of the frame legs, a vertical jack mounted on the frame cross member behind said post, a bracket fixed to said sleeve and extending rearwardly therefrom to which the jack is operatively connected, and means connected between the post and the fork lift cross member for tilting the fork lift relative to the frame.

5. A wheel dolly comprising a horizontal U-shaped wheeled frame having a cross member and spaced legs extending forwardly from the cross member, a post fixed to and rising from said cross member and positioned in front of said cross member, a vertical slide sleeve engaged on said post, said slide sleeve having a journal on its upper end extending crosswise of said frame, a fork lift having an inverted U-shaped portion comprising a cross member journalled through said journal and pendant legs, horizontal arms fixed to and extending forwardly from the lower ends of said pendant legs, said arms extending along the inward sides of the frame legs, a vertical jack mounted on the frame cross member behind said post, a bracket fixed to said sleeve and extending rearwardly therefrom to which the jack is operatively connected, and means connected between the post and the fork lift cross member for tilting the fork lift relative to the frame, said tilting means comprising a lever fixed to the fork lift cross member and extending downwardly therefrom, and adjusting means extending between and connected to the sleeve and the lower end of the lever.

References Cited in the file of this patent

UNITED STATES PATENTS

| | | |
|---|---|---|
| 1,399,351 | Lee | Dec. 6, 1921 |
| 1,964,119 | Hendry | June 26, 1934 |
| 2,490,233 | Schildmeier | Dec. 6, 1949 |
| 2,558,535 | Billings | June 26, 1951 |
| 2,738,087 | Arnot | Mar. 13, 1956 |
| 2,763,053 | Anderson | Sept. 18, 1956 |
| 2,899,093 | Morrell | Aug. 11, 1959 |